INVENTOR.
RICHARD C. PALMER
BY Darby & Darby
ATTORNEYS

March 19, 1957 R. C. PALMER 2,786,096

TELEVISION RANGE FINDER

Filed Nov. 10, 1951 5 Sheets-Sheet 2

INVENTOR.
RICHARD C. PALMER

BY Daly & Daly

ATTORNEY

March 19, 1957 R. C. PALMER 2,786,096

TELEVISION RANGE FINDER

Filed Nov. 10, 1951 5 Sheets-Sheet 3

INVENTOR.
RICHARD C. PALMER

BY Daly & Daly

ATTORNEYS

INVENTOR.
RICHARD C. PALMER

BY Daly & Daly

ATTORNEYS

March 19, 1957 R. C. PALMER 2,786,096

TELEVISION RANGE FINDER

Filed Nov. 10, 1951 5 Sheets-Sheet 5

INVENTOR.
RICHARD C. PALMER

BY Daly & Daly

ATTORNEYS

United States Patent Office 2,786,096

Patented Mar. 19, 1957

2,786,096

TELEVISION RANGE FINDER

Richard C. Palmer, Pompton Plains, N. J., assignor to Allen B. Du Mont Laboratories, Inc., Clifton, N. J., a corporation of Delaware Application November 10, 1951, Serial No. 255,804

14 Claims. (Cl. 178—6.8)

This invention relates to a system and apparatus for television range-finding.

The instantaneous line of sight of a television system is defined by two characteristics: the center of the lens system and the instantaneous position of the scanning spot. The television system thus affords a convenient method for the remote control of the line of sight by such expedients as centering the scanning raster or by delaying the synchronizing pulses for the scanning circuits. This control over the line of sight can be effected either at the camera or at the viewing monitor, provided a reticle on the monitor is used as a reference. Control at the monitor is more convenient from the standpoint of remote operation.

A presentation of the type afforded by a split-image range-finder is most useful because it is analagous to the well-known split-image photographic range-finder and because it employs the operator's sense of symmetry. In a split-image television range-finder system the monitor is switched, or gated, between the two complete images of the same scene from adjacent viewpoints, and complementary portions of each television image are presented on a viewing monitor to form a complete picture divided into upper and lower portions which meet at a dividing line, or split. The selection of the complementary portions to be viewed is made by switching, or gating between the two signals at appropriate intervals; and it is desirable that the gating signal be variable to allow the split to be moved by the operator from near the bottom of the picture to the top in order to insure having this split bisect any desired area in the image. Means must be provided to shift one portion of the image—either the upper portion or the lower portion—laterally with respect to the other portion to bring into coincidence selected target areas lying above and below said split and immediately adjacent thereto. A measurement of the shifting required to bring the split-image of the target scene into coincidence will permit evaluation of the paralactic displacement of corresponding points in the two images and this displacement, interpreted in the light of knowledge of the characteristics of the system, permits the range from the cameras to the target to be obtained.

One object of this invention is to provide a system and apparatus for television range finding.

Another object is to provide a television range-finding system and apparatus therefor for measuring, at a viewing monitor, the range from remote camera location to a target in the object field thereof.

Other objects are to provide television range finding apparatus of the split-image type in which the split may be positioned vertically from substantially the top of the image to the bottom, to provide means in such apparatus to shift the presentation of one portion of said split image with respect to the other, and to provide means operating on the synchronizing signals to obtain said shifting.

Further objects will be apparent after studying the following specification together with the drawings in which.

In carrying out the objects of the invention, two views are obtained of the desired scene. These views may be obtained from separate cameras spaced in a predetermined manner from each other or from a single camera utilizing well-known optical and electrical principles to obtain separate views of the same scene. In the latter case, the views must be presented sequentially. Operating power and synchronizing voltages are supplied to the camera or cameras and electrical signals representing the two views are obtained therefrom and transmitted to a monitoring location. An electronic switch, or gate generator, is provided to gate the signals in a predetermined sequential manner to present on the viewing monitor screen a picture in which the upper portion represents the upper portion of one view of the scene and the lower portion represents the complementary, or lower, portion of the other view of the scene.

The gate generator is preferably adjustable so that the level of the split between the two images may be set at any desired level from substantially the top of the picture to the bottom, and a shifting circuit is provided together with means for electrically connecting and disconnecting it from the remainder of the circuit. The purpose of the delay circuit is to shift one portion of the picture horizontally with respect to the other portion until selected sections of a chosen target in the picture coincide. The shifting control in the delay circuit may be calibrated to obtain a quantitative measure of range by predetermined calculations based on the amount of rotation of the control required to obtain coincidence.

Figure 1:
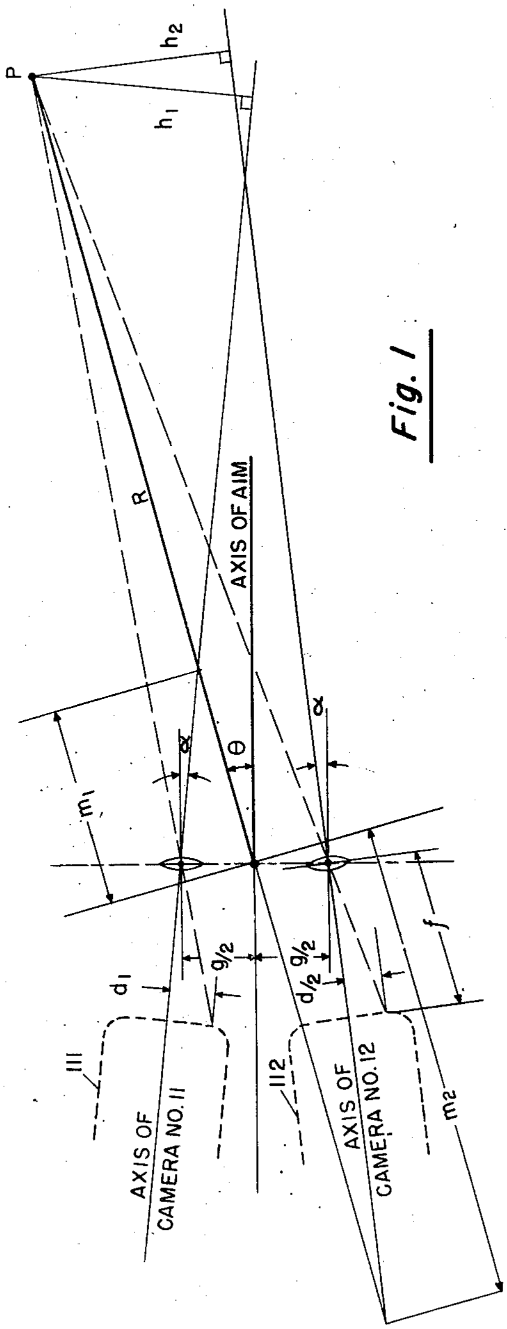
Figs. 1 and 2 show the geometrical layout of typical embodiments of the optical sections of television range finding apparatus constructed according to the invention.
Figure 2:
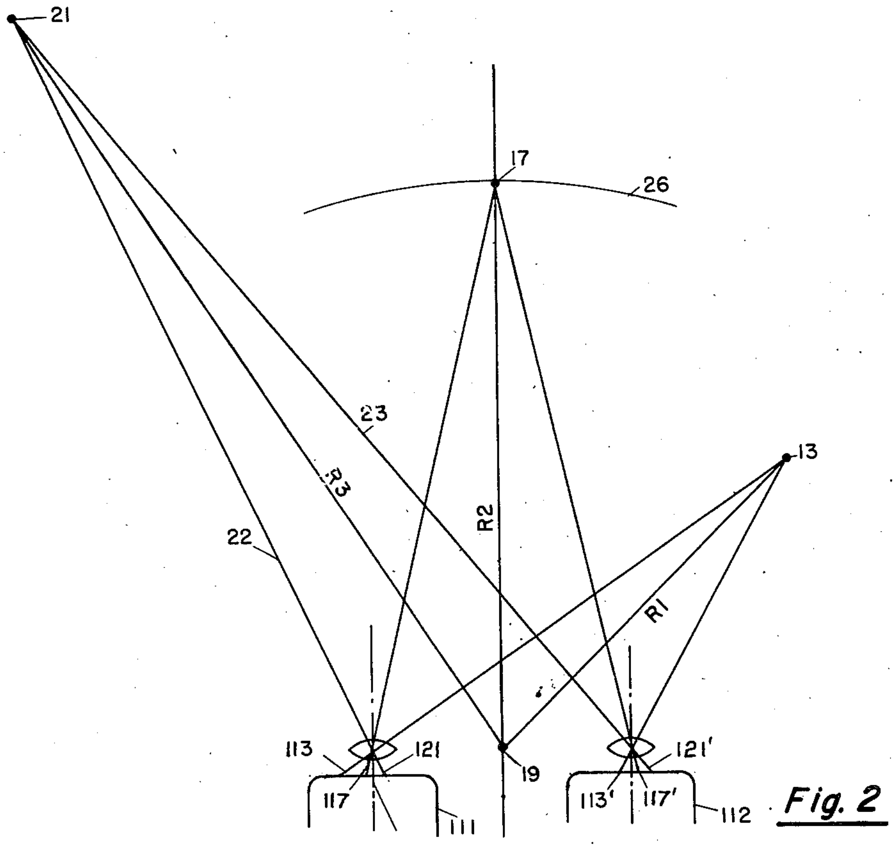

The optical diagrams in Figs. 1 and 2 show the geometrical relations between the optical components, and these figures will be described first in order to facilitate the description of the invention, one embodiment of which appears in the electrical circuit of Fig. 4.

In the range finder of Fig. 1, the axes of the two television cameras 11 and 12 represented here by just the pickup tubes 111 and 112, respectively, are inclined toward each other by an angle $\alpha$. The target point P, a general point in the field of view is defined by its range R and azimuth $\theta$. The separation between lenses (base line) is $g$.

From the geometry of Figure 1.

$$\frac{M_1}{\sin(90°-\alpha)}=\frac{g|2}{\sin(\theta+\alpha)};\ M_1=\frac{g\cos\alpha}{2\sin(\theta+\alpha)} \quad (1)$$

$$\frac{M_2}{\sin(90°+\alpha)}=\frac{g|2}{\sin(\theta-\alpha)};\ M_2=\frac{g\cos\alpha}{2\sin(\theta-\alpha)} \quad (2)$$

Now, $$h_1=(R-M_1)\sin(\theta+\alpha)=R\sin\theta\cos\alpha+R\cos\theta\sin\alpha-M_1\sin\theta\cos\alpha-M_1\cos\theta\sin\alpha \quad (3)$$

$$(h_1-h_2)=2R\cos\theta\sin\alpha-(M_1+M_2)\sin\theta\cos\alpha-(M_1-M_2)\cos\theta\sin\alpha$$

From (1) and (2), $$M_1+M_2=\frac{g}{2}\cos\alpha\left[\frac{1}{\sin(\theta+\alpha)}+\frac{1}{\sin(\theta-\alpha)}\right] \quad (4)$$

$$M_1+M_2=\frac{g\cos\alpha(\sin\theta\cos\alpha)}{\sin(\theta+\alpha)\sin(\theta-\alpha)}$$

$$M_1-M_2=\frac{g}{2}\cos\alpha\left[\frac{1}{\sin(\theta+\alpha)}-\frac{1}{\sin(\theta-\alpha)}\right] \quad (5)$$

$$M_1-M_2=-\frac{g\cos\alpha(\cos\theta\sin\alpha)}{\sin(\theta+\alpha)\sin(\theta-\alpha)}$$

Thus, $$(h_1-h_2)=2R\cos\theta\sin\alpha-\frac{g\cos\alpha}{\sin(\theta+\alpha)\sin(\theta-\alpha)}[(\sin\theta\cos\alpha)^2-(\cos\theta\sin\alpha)^2]=2R\cos\theta\sin\alpha-\frac{g\cos\alpha}{\sin(\theta+\alpha)\sin(\theta-\alpha)}(\sin\theta+\alpha)\sin(\theta-\alpha)(h_1-h_2)=2R\cos\theta\sin\alpha-g\cos\alpha \quad (6)$$

If the distance from the center of the lens to the image plane (front of the camera tube) is $f$, then $$\frac{d_1}{f}=\frac{h_1}{R\cos(\theta+\alpha)+\frac{g\sin\alpha}{2}}$$

For $\alpha$ small and for R very much greater than $g$, with little error we may write $$\frac{d_1}{f}=\frac{h_1}{R\cos\theta};\ d_1=\frac{f}{R\cos\theta}h_1 \quad (7)$$

Similarly, $$d_2=\frac{f}{R\cos\theta}h_2 \quad (8)$$

Thus, $$(d_1-d_2)=\frac{-gf}{R\cos\theta} \quad (9)$$

The quantity $(d_1-d_2)$ is the displacement between corresponding points of the two images, and would be measured in terms of the shift of one image required to bring about coincidence on a split-field viewing monitor.

It should be noted that Equation 9 is exact if the optical systems are parallel to each other; and, since an important use of television range-finding devices is in the remote control of artillery where boresighting is desirable when firing point-blank or when one of the range-finding cameras is disabled, the parallel mounting is preferable as both cameras are then substantially boresighted.

In Fig. 2 the pair of pick-up tubes 111 and 112 is mounted parallel, and three line targets are shown in the object field. The target 13 closest to the cameras is imaed on the pick-up tube 111 at the point 113 and appears on the screen 14 of the viewing monitor 16 of Fig. 3 as a line 213. Target 13 is also imaged on the pick-up tube 112 at the point 113′ and appears at the bottom part of the screen 14 as a line 213′. Correspondingly, the target 17 is imaged at 117 and 117′ on tubes 111 and 112 respectively and appears as lines 217 and 217′ on screen 14. It should be noted that the reticle 18 which represents the center of both tubes 111 and 112 is midway between the images 217 and 217′ because of the fact that the target 17 is directly ahead of the center 19 of the optical system and therefore equidistant from the tubes 111 and 112.

The target 21 is imaged at points 121 and 121′ on tubes 111 and 112 respectively and appears on the screen 14 as lines 221 and 221′, which are the closest together of any of the three pairs of lines. The fact that the lines 221 and 221′ have the smallest lateral separation arises from the condition that the radius $R_3$ from the optical center 19 to the target 21 is longer than either radius $R_1$ or $R_2$ to the targets 13 and 17 respectively.

Conversely, inspection of the images on screen 14 shows that the two lines 213 and 213′ have the greatest lateral separation of any of the free pairs of lines because the target 13 is closest to the tubes 111 and 112.

The lateral separation of the two vertically adjacent sections of a target immediately above and below the horizontal dividing line 24 as given by the Equation 9 is primarily dependent on the physical dimensions of the optical set-up and the radius R from the optical center 19 to the target. The cos $\theta$ may be neglected for small angles, i. e., targets near the center of the picture on screen 14. All such targets, for instance, target 17, on the circle 26 generated by radius $R_2$ and lying within a small angle on either side of the optical axis, through target 17 would have the same separation as the lines 217 and 217′.

As is well-known from analogous optical range-finders, it is necessary to shift the upper portion of the image on the screen 14 to the right or the lower portion to the left until the line representing the desired target, for instance, line 213, is aligned with the corresponding line, in this case line 213′, in order to obtain the range from the optical center 19 to the target 13. Assuming the standard television scanning pattern from left to right and top to bottom, the means for aligning the two portions of the target image on the screen 14 can take the form of a continuously variable delay line between the camera 11 and the viewing monitor 16, since, as is shown by the arrow 27 in Fig. 3, the top portion of the target scene is obtained from the camera 11.

Alternatively, the means for aligning the two portions of the image may be connected to the positioning circuits of either of the two cameras 11 and 12, or to the viewing monitor 16. If the positioning means affects the position of the raster in the cameras, it can shift the entire raster but if the positioning circuits of the monitor 16 are to be affected, means must be provided to key, or gate, the shifting circuit on during the presentation of one portion of the image, and off during the presentation of the other portion of the image. If alignment of the two sections of the image is accomplished by positioning the raster, the positioning may be inserted to shift the upper part to the right or the lower part to the left and need not be limited to just one direction as is the case for the delay line shifting means described above.

A third form of shifting means comprises a circuit to delay the horizontal synchronizing pulses and this circuit may operate either on camera 11 or on the viewing monitor 16 with restrictions which will be set forth hereinafter. In order to explain the operation of this third shifting means, reference will be made to the electrical circuit diagram of Fig. 4 together with corollary waveforms in Fig. 5 and the television image in Fig. 6.

Figure 4:
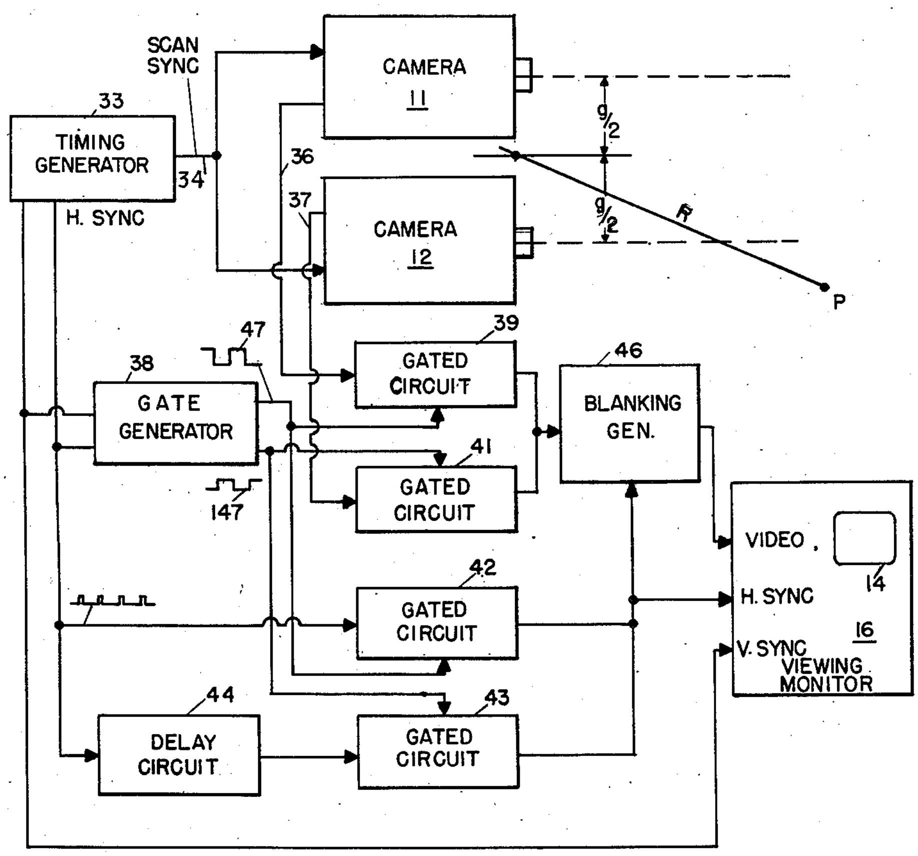
Fig. 4 shows an electrical diagram in block form of television range finding apparatus constructed according to one embodiment of the invention.

In the block diagram of Fig. 4 the two cameras 11 and 12 containing the pick-up tubes 111 and 112 shown in Fig. 2 are used to transform the light image of the object field into electrical signals. The first of these signals is represented by waveform 28 in Fig. 5, which is a simplified version of the video and blanking signal in camera 11 for one television field of which only a few lines have been shown. Waveform 29 comprises a similarly simplified signal from camera 12. In the first waveform 28 the signal representing the target image has the form of a series of vertical pips 31 which, it will be noted, occur in only four lines of the field, indicating that the target has the shape of a short rod.

Figure 3:
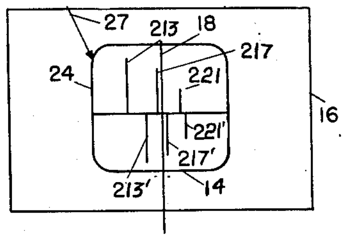
Fig. 3 shows a typical split-image obtained in television range finding apparatus of the type described.
Figure 6:
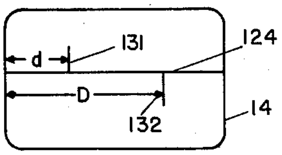
Fig. 6 shows another split image such as would result from the waveforms in Fig. 5.

Fig. 6, which represents the picture tube 14 also shown in Fig. 3, shows the small image of the target separated into an upper section 131 and lower section 132, the latter being formed by the vertical pips 32 in waveform 29. These pips 32 also occur in only four lines of the field.

The operation of the cameras 11 and 12 is synchronized by signals from the timing generator 33 which is connected to the cameras 11 and 12 by a lead 34. The lead 34 may, if it is found desirable, include a radio link; and if such a link is included, similar links may also be included in leads 36 and 37 which carry the signal waveforms 28 and 29 from the cameras 11 and 12 to the monitoring location.

At the monitoring location the timing generator 33 is connected to and synchronizes the operation of an electronic switch, or gate generator 38, which in turn is connected to a first pair of gated circuits 39 and 41 and to a second pair of gated circuits 42 and 43. Each of these gated circuits has a pair of gating signal input terminals to which the gate generator 38 is connected and a pair of information signal input terminals.

The leads 36 and 37 from the cameras 11 and 12 are connected to the information signal input terminals of the gated circuits 39 and 41, respectively. The horizontal synchronizing signal output terminals of the timing generator 33 are connected directly to the information signal input terminals of the gated circuit 42 and through a delay circuit 44 to the information signal input terminals of the gated circuit 43 to provide the necessary delay of the horizontal synchronizing signals for the viewing monitor 16 thereby causing chosen parts of the target image to coincide on the screen 14.

The output terminals of the gated circuits 39 and 41 are connected in parallel to the information signal input terminals of a blanking generator 46 which is also provided with a second set of input terminals to which the common output of the gated circuits 42 and 43 is connected. The output terminals of the blanking generator circuit 46 are connected to the information signal input terminals of the viewing monitor 16. The viewing monitor 16 is also provided with input terminals for the horizontal synchronizing signals, which terminals are connected to the common output of the gated circuits 42 and 43, and with vertical synchronizing signal input terminals which are connected to the timing generator 33.

Figure 5:
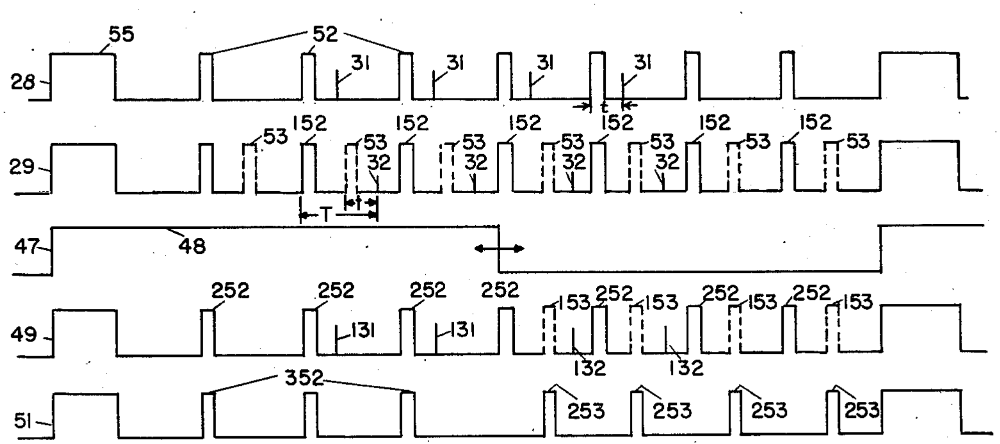
Fig. 5 shows electrical wave forms which obtain in the operation of the circuit in Fig. 4.

The output signal of the gate generator 38 is a rectangular wave 47 shown in Figs. 4 and 5. In the polarity shown, the signal 47 operates on the gated circuit 39 to cause it to conduct during the positive portion 48 and allow signals applied to the information input terminals during that time to pass through the gated circuit 39 to the blanking generator 46. A similar but inverted gating signal 147 is also developed in the gate generator 38 and applied to the gated circuit 41. Since the polarity is inverted, the gated circuit 41 is rendered non-conductive during the portions 48 of the wave 47, and, therefore, the gated circuits 39 and 41 conduct alternately and not simultaneously to pass a composite signal 49 to the blanking generator 46.

The gating signals applied to the gated circuits 42 and 43 should be identical in shape with the gating signals 47 and 147 applied to the circuits 39 and 41 although it is not necessary that the gating signals for the circuits 42 and 43 be obtained from the same output terminals of the gate generator 38 as signals 47 and 147. The action of the gated circuits 42 and 43 is identical with the action of the gated circuits 39 and 41 in that circuit 42 conducts simultaneously with circuit 39 and circuit 43 conducts simultaneously with circuit 41. Since the information signals applied to the information signal input terminals of gated circuits 42 and 43 comprise the horizontal synchronizing pulses in direct and delayed form respectively, the output signal from the pair of gated circuits 42 and 43 comprises a composite horizontal synchronizing signal as shown by the wave form 51, and it is this composite horizontal synchronizing signal which is used to synchronize the horizontal sweep circuits in the viewing monitor 16.

Circuits capable of selecting any desired synchronizing pulse 50 out of all of the synchronizing pulses in a television frame period are taught by Olsen in U. S. patent application Serial No. 226,694, and by Abbenhouse in U. S. patent application Serial No. 37,342. These references disclose two different combinations of circuits for selecting the predetermined synchronizing pulse 50, and it is well known to use such a pulse to synchronize the operation of a rectangular wave generator to produce the pulse wave 47. Preferably a bistable oscillator, that is, one having two stable conditions, should be used as the gate generator 38. Such an oscillator remains in one stable condition until synchronized by the predetermined pulse 50, at which time it shifts to the other stable condition until synchronized by the vertical synchronizing pulse 55. It is taught in either of the above mentioned references to select any of the pulses 52 as the pulse 50, and the dividing line 24 in Fig. 3 or the line 124 in Fig. 6 is thereby set at a level on the picture corresponding to the line for which pulse 50 is the synchronizing pulse. This is equivalent to changing the duty cycle of the wave 47 as indicated by the double-ended arrow.

It will be noted in the waveform 28 that the pips 31 representing the target occur at a time "$t$" following the beginning of synchronizing pulses 52; whereas in the waveform 29, the pips 32 representing the target occur at a time "T" following the synchronizing pulses 152, which are coincident with the pulses 52. If the pulses 52 and 152 were used to synchronize the horizontal sweep circuits in the viewing monitor 16, the composite picture on the screen 14 as shown in Fig. 6 would comprise an upper section having a portion 131 of the image of the target located at a distance "$d$" from the left hand edge of the picture and a lower portion 132 of the image of the target located a distance "D" from the left hand margin of the picture.

Since it is the object of the invention to provide apparatus to cause the upper and lower portions 131 and 132 to coincide about the dividing line 124, a delay must be introduced by the delay circuit 44 to cause the actual synchronizing pulses which synchronize the viewing monitor during the presentation of the lower portion of the picture to occur as indicated in waveforms 29 and 49 at the times 53. As indicated in the waveform 29, the time duration between the leading edge of a pulse 53 and corresponding target pip 32 is "$t$" which is exactly the same as the time between the leading edge of the pulse 52 and the corresponding target pip 31 in the waveform 28. The time $T-t$ is a measure of the delay and consequently is a measure of the distance $D-d$ by which the portion 132 of the target image in Fig. 6 must be shifted to the left to cause it to be aligned with the upper portion 131. Although the control in the delay circuit 44 may operate so as to reduce either $D-d$ or $T-t$ to zero, it may be calibrated in terms of R, the range R from the optical center 19 to the target at the point P, and the operator may therefore read the range R directly.

If it is desirable that the retraced lines be eliminated from the lower half of the picture there arises the necessity for providing a blanking generator 46 following the gated circuits 39 and 41 arises from the displacement of the synchronizing pulses to the positions 153 in waveform 49. Since the horizontal retraces occur during the times indicated by the dotted pulses 153 in signal 49 corresponding to pulses 53 in signal 29, whereas the picture tube 14 is blanked by the pulses 252, corresponding to the pulses 52 in signal 28 and 152 in signal 29, blanking signals must be added to the waveform 49 by the generator 46 at the times indicated by these dotted pulses. The blanking generator 46 must therefore be controlled by the synchronizing pulses 51.

It should be noted that the original pulses 52 in waveform 29 are represented as both blanking and synchronizing pulses, although it is well known to superimpose shorter-duration synchronizing pulses on top of blanking pulses, and such synchronizing pulses may be added to pulses 52 if desired.

Figure 7:
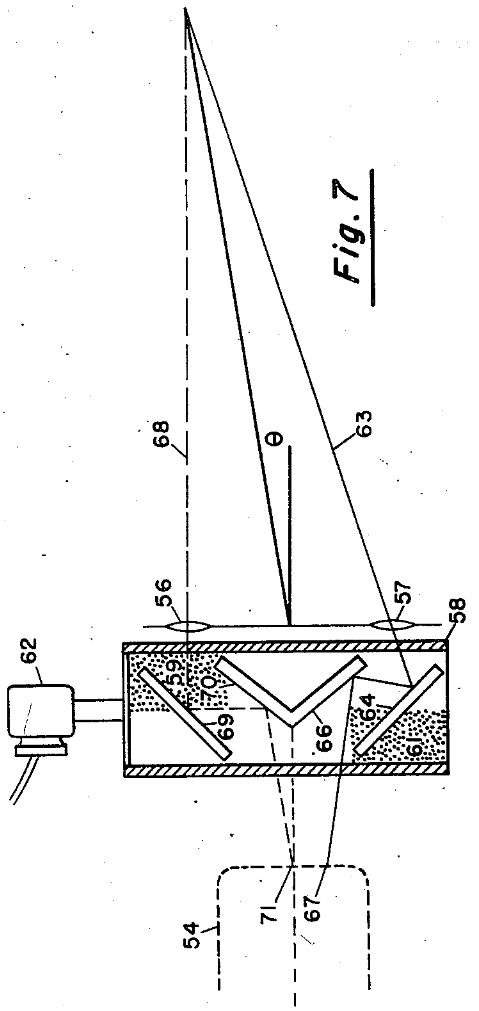
Fig. 7 is a modification of the optical layouts shown in Figs. 1 and 2.

Figure 7 shows a modification of the pick-up means in Figs. 2 and 4. A single camera tube 54 receives separate images of the target point P through two lens systems 56 and 57. In order to prevent these two images from appearing simultaneously on the photoelectric surface of the pick-up tube 54, shutter means must be provided to allow the light to pass alternately through the two lens systems 56 and 57. A rotating cylindrical shutter is illustrated in this figure, although other well-known types of shutters may be equally satisfactorily used.

The shutter comprises a cylinder 58 surrounding a plurality of mirrors arranged in the form of a double periscope to converge the light from the two lens systems 56 and 57 onto the pick-up tube 54. The cylinder has selected portions thereof which are transparent and other portions which are opaque. One way in which the desired opacity may be obtained is by using a transparent cylinder and applying Aquadag coating to selected portions of the inside wall indicated by the dotted sections 59 and 61.

Figure 8:
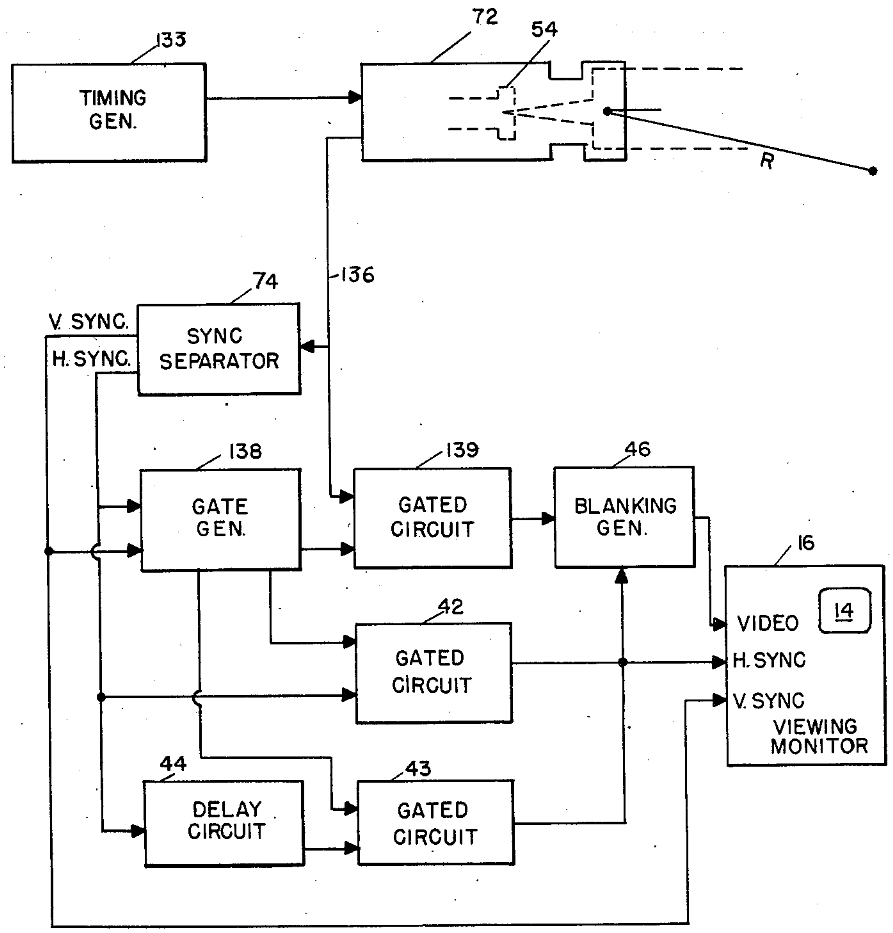
Fig. 8 shows a modification to the block diagram of Fig. 4.

As the cylinder 58 is rotated by a motor 62 in synchronism with the field or frame frequency of the timing generator 133 of Fig. 8, light from the object point P will, at certain times, pass through the lens system 57 and through one transparent side of the cylinder 58 along the path 63, striking a mirror 64 inside the cylinder 58 and being reflected from there to a second mirror 66 which is also located inside the cylinder 58. This ray of light is reflected by the second mirror and passes out of the cylinder 58 through the opposite wall, eventually impinging on the photoelectric surface of the tube 54 at the point 67.

Simultaneously, a ray 68 from the object point P passes through the lens system 56 but is stopped by the opaque section 59 in the cylinder 58. However, at alternate times, when the opaque section 59 has rotated out of the path, the ray 63 will be stopped and the ray 68 will continue along the path indicated by the dotted line striking first the mirror 69 and being reflected from there to the mirror 70, where it will again be reflected so as to pass out of the opposite wall of the cylinder 58 and impinge on the photoelectric surface of the tube 54 at the point 71.

Figure 9:
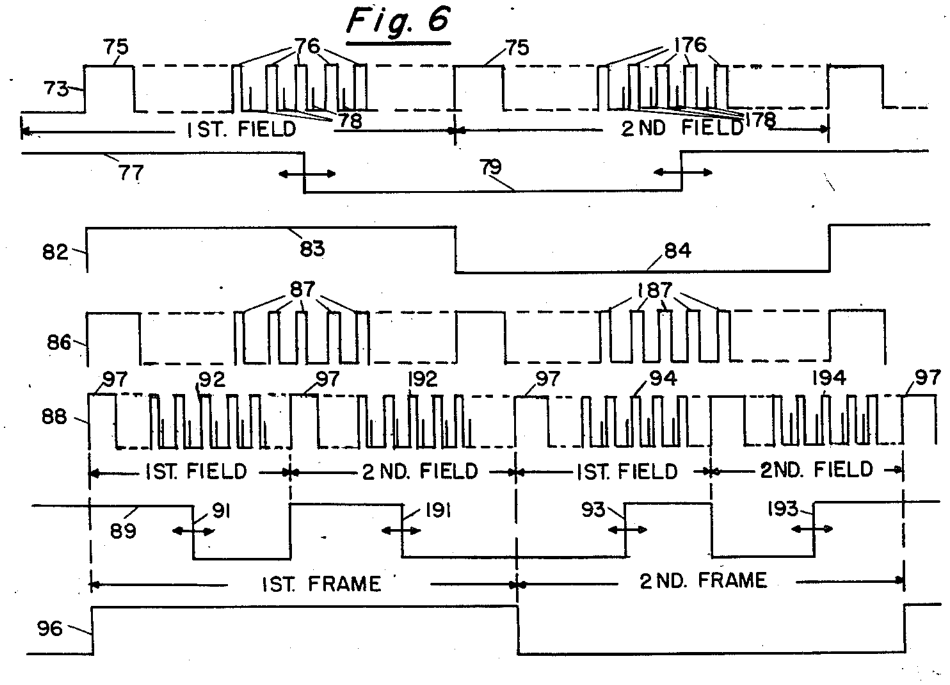
Fig. 9 shows the necessary modifications of the waveforms in Fig. 5 when the optical modification of Fig. 7 is employed.

The displacement between the point 67 and the point 71 is equivalent to the displacement ($d_1-d_2$) in Equation 9, and therefore the mathematical derivation of Equation 9 holds for the optical arrangement in Fig. 7. It will be obvious, however, that the electrical signal transmitted to the monitoring location from a single pick-up tube 54 must differ from the two signals 28 and 29 in Fig. 5 and hence must be treated differently. The apparatus for generating and utilizing the signal from the single pick-up tube is shown in Fig. 8 and the waveforms which obtain in the operation of this circuit are shown in Fig. 9. Elements of Fig. 8 which are identical with elements in other figures are indicated by the same reference characters.

The single camera 72 contains the pick-up tube 54, shown here in dotted lines, as well as the image splitting optical arrangement which was shown in more detail in Fig. 7. The operation of the circuits in camera 72 is synchronized by the timing generator 133, which need not be connected to the remainder of the circuit by any other links; and the composite video and synchronizing output signal 73 from the camera 72 is transmitted along a lead 136, which may comprise a radio link, to a synchronizing signal separator 74 and to a gated circuit 139. The synchronizing signal separator 74 provides at the output terminals thereof vertical and horizontal synchronizing pulses corresponding to pulses 75 and 76 respectively. The output terminals of the separator 74 from which the pulses 75 and 76 (Fig. 9) are to be taken are connected to appropriate terminals of the gate generator 138, the delay circuit gated circuit 42, and the viewing monitor 16.

The output voltage 77 from the gate generator 138 is synchronized by a particular one of the pulses 76 in the same way as the signal 47 in Fig. 5 is synchronized by one of the pulses 52, and the apparatus described in the aforementioned references is equally applicable in selecting a particular one of the pulses 76 for synchronizing wave 77 as in selecting a particular one of the pulses 52 for the synchronizing wave 47.

The composite signal 73 comprises a first field which may be identical in all respects to one field of the signal 28 in Fig. 5 and a second field which may be identical in all respects to one field of the signal 29 in Fig. 5. The horizontal synchronizing and/or blanking pulses in the first field of signal 73 are indicated by the reference character 76 while in the second field, they are represented by the reference character 176. In the first field, the target pips are indicated by the reference character 78 while in the second field they are represented by the reference character 178, and, just as in Fig. 5, the target pips 178 of the second field occur at a later time of each line period than the target pips 78. The description hereinabove of the necessity for delaying the synchronizing pulses in one field 29 to cause them to have the proper time relationship with the target pips in that field is equally applicable in the case of the signal 73 and will not be repeated here.

Since the two images of the target are transmitted sequentially along the line 136 in Fig. 8, it is not necessary to provide two gated circuits as in Fig. 4 and only the single gated circuit 139 is provided here. Consequently, the wave 77 must be used to blank out presentation of one part of the first field and the complementary part of the second field. The result is that the blanking signal 77 generated by the gate generator 138 is a square wave instead of the rectangular wave 47 in Fig. 5. The polarity of the signal 77 shown causes the portions of the first and second fields of signal 73 occurring during the negative part 79 of the square wave 77 to be gated out or prevented from being displayed on the viewing monitor screen 14.

Since the wave 77 must be a square wave, it is necessary only to change the timing, or phasing, of wave 77 with respect to the timing of the composite signal 73 in order to raise or lower the level of the dividing line 124 on the viewing monitor screen 14 in Fig. 6. This is in contradistinction to wave form 47 in Fig. 5 in which the duty cycle must be varied in order to raise or lower the lever of the dividing line 124 on the screen 14. This difference is indicated by the double ended arrows which indicate the edge of the gating signal which must be varied in order to shift the level of the line 124. In signal 47 only the trailing edge need be varied; the leading edge is always synchronized by the vertical blanking signals. On the other hand, in wave form 77, both the leading and trailing edges must be varied, and they must be varied in unison. Furthermore, the fundamental frequency or repetition rate of the signal 77 is exactly ½ of the repetition rate of the signal 47 if the same field frequency obtains for both waves.

There is still another difference which results from the sequential presentation of the signals in wave form 73. Since the viewing screen is blanked out for exactly half of the time, it is unnecessary to shift the timing of the synchronizing pulses 176 of the second field exactly at the time that the gated circuit 139 is rendered conductive by the leading edge 81 of the wave 77. Instead, all of the synchronizing pulses 176 of the second field may be shifted in the manner described in connection with the shifting of only pulses 53 of all the pulses 52 in Fig. 5. This shifting is actuated by the gating signal 82, which is also obtained from the gate signal generator 138 and applied to the gated circuits 42 and 43 to render them alternately conductive during the positive portion 83 and the negative portion 84, respectively, of the waveform 82. Consequently, the shift in timing of the horizontal synchronizing pulses occurs during the vertical blanking period when any lack of synchronism would be unnoticed.

It will be remembered that it was necessary to shift the timing of the horizontal synchronizing pulses in signal 51 of Fig. 5 at the same time as the shift from signal 28 to signal 29 was made. Such a shift in the timing of the horizontal synchronizing pulses in signal 51 of Fig. 5 at the same time as the shift from signal 28 to signal 29 was made. Such a shift in the timing of the horizontal synchronizing pulses during the presentation of the image frequently may lead to jitter or lack of synchronization for a line or two until the horizontal sweep circuits of the monitor 16 have time to become readjusted, and this jitter is very undesirable since it comes at the critical point where the two bisected sections 131 and 132 of the target must be aligned. By means of the signal 82 the horizontal synchronizing signal 86 is generated in which all the horizontal synchronizing pulses 87 during the first field are timed to coincide with pulses 76 in signal 73 and all of the horizontal synchronizing pulses 187 during the second field are timed to be displaced from the corresponding pulses 176. There is no change in the timing between any two succesive pulses 187 such as occurs between the pulses 352 and 253 in signal 51 of Fig. 5.

In waveforms 73, 77 and 82, two fields have been illustrated. These fields could be separate and distinct fields or they could be the two fields of an interlaced type of television signal in which the lines in the second field would interlace with the lines in the first field. It will be obvious from an examination of signal 77 that if these signals were interlaced, the resolution of the image would be reduced since half of the lines in the first field and half of the lines in the complementary portion of the second field would be gated out. It is assumed, of course, that the field frequency remains the same.

An alternative arrangement is shown in connection with the signal 88 which comprises four fields making up two frames of an interlaced type of television signal. The signal 89, corresponding to the signal 77 and the signal 47 in Fig. 5, is generated so as to display the upper lines of the first field and the upper lines of the second, or interlaced, field of the first frame and then the lower lines of the first and second fields of the second frame. The periodicity of the display of the complete image is reduced by a factor of two, if the field frequency of the the signal 88 is the same as the field frequency of the signal 73, and in addition the gating signal 89 is more asymmetrical than the corresponding gating signal 77, as may be seen by inspection.

In generating signal 89, the trailing edge 91 is timed to coincide with the synchronizing pulse 92 of the first field and the trailing edge 191 of the second field is timed to coincide with the pulse 192. In the second frame the leading edge 93 is timed to coincide with the pulse 94 and the leading edge 193 is timed to coincide with the pulse 194.

As is well known in the television art, the pulse 94 of an interlaced television system corresponds exactly to the pulse 92 and the pulse 194 corresponds exactly to the pulse 192, so that for certain occurrences of a pulse, a trailing edge must be generated in the signal 89, and for other occurrences of the same pulse, a leading edge must be generated. The waveform 89 is therefore more complicated than the waveform 77, but the generation of such complicated waveforms is well within the purview of those skilled in the art, and a circuit for generating this complicated form might well take the form of the circuits described by Mulligan and Talamini in U. S. Patent No. 2,556,933.

The waveform 96 generated by the gate generator 138 to switch the synchronizing signals in the gated circuits 42 and 43 corresponding to the gating of the signal 88 in gated circuit 139 by the waveform 89 is similar to the waveform 82 except that the fundamental frequency is only half that of signal 82. The synchronizing signals for the second frame of the signal 88 may all be delayed exactly as are the synchronizing signals for the second field in signal 86.

It will be noted from an examination of Figs. 5 and 9 that the range finding system utilizing the signal voltages of Fig. 5 allows the simplest form of gate generator 38 since the gating signal 47 has the same form for both the gating circuits 39 and 42 and an inverted replica of that form for the gated circuits 41 and 43. It is necessary only to select a given synchronizing pulse in each field period and use that pulse always to trigger a trailing edge on the waveform 47. The only complication is that the trailing edge must be varied as indicated by the double ended arrow; the leading edge may always be synchronized by the vertical synchronizing pulses 55.

The systems described in connection with Fig. 8 may require the gate generator 138 to provide two gating signals, either signals 77 and 82 or signals 89 and 96, thereby increasing the complexity of the circuits in the gating generator 138. However, these latter systems have the compensating advantages that there need be no jitter during the presentation of the image, since all of the synchronizing signals of alternate fields may be delayed instead of part of the synchronizing signals of each field as in Fig. 5, and the other important advantages of the improvement in linearity which results from the use of a single pick-up tube 54 in Figs. 7 and 8.

The generation of the gating signals 82 and 96 is very simple since both leading and trailing edges may be synchronized by the vertical synchronizing signals 75 and 97, respectively. It is in the generation of the waveforms 77 and 89 that additional difficulties are encountered since one of the pulses 76, for wave 77, or pulses 92 and 192, for wave 89, must be selected to generate a trailing edge and a corresponding one of the pulses 176 or pulses 94 and 194 must be selected to generate a leading edge in the gate generator 138. All of the leading and trailing edges so timed must be varied as in unison shown by the double ended arrows.

Specific embodiments have been used to illustrate the apparatus and method of the invention but such embodiments should not be construed as limiting the scope thereof, the scope instead being determined by the following claims.

I claim:

1. Television range-finding apparatus comprising pickup means for translating two adjacent views of an object field into two television signal voltages; each said signal voltage representing a portion of a complete view of said object, the combined signal voltages representing a single complete view, a monitor comprising a viewing screen; means connecting said pickup means to said monitor to generate on a first portion of said viewing screen a corresponding first portion of a television image by one of said signal voltages and to generate on a second portion of said viewing screen a corresponding second portion of a television image by the other of said signal voltages; means for adjusting the proportion of said first and said second images in the said single complete picture; and electrical means for shifting the position of said first image portion relative to the location of said second image portion on said viewing screen.

2. Television range-finding apparatus comprising a television camera having a single photo-sensitive pickup device; optical means for forming an image of an object field on said photo-sensitive device to cause said camera to generate a first television signal voltage; second optical means for forming a second image of said object field on said photo-sensitive device to cause said camera to generate a second television signal voltage; each said signal voltage representing a portion of a single complete view of said object, the combined signal voltages representing a complete view, shutter means between said photo-sensitive device and said object field to allow only one of said optical images to be formed at a time; means to operate said shutter to switch from one of said images to the other of said images alternately; a monitor comprising a viewing screen; means connecting said pickup device to said monitor to generate on a first portion of said viewing screen a first portion only of a television image represented by said first signal voltage and to generate on a second portion of said viewing screen a second portion only of a television image represented by said second signal voltage; means to synchronize said shutter operating means and said pick-up connecting device; and electrical means for shifting the position of said first portion of a television signal image relative to the position of said second portion of a television image on said viewing screen.

3. Television range-finding apparatus comprising pick-up means for translating two adjacent views of an object field into two television signal voltages; a monitor comprising a viewing screen; means connecting said pickup means to said monitor to generate a single complete television image on said viewing screen, said television image comprising an upper portion generated by one of said signal voltages representing the upper portion of one of said views extending from an edge to a predetermined dividing line, and a lower portion generated by the other of said signal voltages representing the complementary lower portion of the other of said views from said dividing line to the opposite edge of said picture; said connecting means including gated means connected to said pickup means to receive said two signal voltages therefrom; gating means connected to input terminal of said gated means to provide a gating signal to switch said signal voltages alternately, said gated means being connected to said monitor to supply said signal voltages alternately thereto; blanking means energized by said gating means to prevent undesired portions of said television signal voltages from affecting said image on said viewing screen; and electrical means for shifting one said portion laterally with respect to the other said portion to align corresponding parts of said images immediately above and below said predetermined level on said viewing screen.

4. Television range-finding apparatus comprising pick-up means for translating two adjacent views of an object field into two television signal voltages; a monitor comprising a viewing screen, said monitor being connected to said pickup means to present on said viewing screen a single complete television image; means connecting said pickup means to said monitor during one period of time to energize said screen by one of said signal voltages to generate a pattern representing the top part only of one of said views; said top part extending from an edge to a predetermined dividing line; means connecting said pick-up means to said monitor during a second period of time to energize said screen by the other of said signal voltages to generate a pattern representing the complementary bottom part only of the other of said views; said bottom part extended from said dividing line to the opposite edge; said connecting means including gated means connected to said pickup means to receive said two signal voltages therefrom; gating means connected to input terminals of said gated means to provide a gating signal to switch said signal voltages alternately, said gated means being connected to said monitor to supply said signal voltages alternately thereto; blanking means energized by said gating means to prevent undesired portions of said television signal voltages from affecting said image on said viewing screen; and means for shifting one of said portions horizontally to align corresponding parts of said images.

5. Apparatus according to claim 1 in which said means for shifting the position comprises a delay circuit connected between said pickup means and said monitor to delay the presentation of said second portion of a television image.

6. The apparatus of claim 1 including deflection circuits for said monitor, said electrical means being connected to said deflection circuits to shift the position of one of said portions of said image.

7. The apparatus of claim 1 including deflection circuits for said monitor, said deflection circuits being synchronized by voltage pulses occurring at predetermined intervals in said television signal voltages, said electrical means being connected to said deflection circuit to delay said synchronizing pulses to shift the presentation of one said image portion with respect to the other said image portion.

8. The device of claim 4 including means for varying said predetermined level on said image.

9. The device of claim 4 including means to vary the duty cycle of the gating signal from said gating means in order to vary said predetermined level on said image.

10. The device of claim 4 including means operating on said gating means to vary the timing of the gating signal therefrom and means for holding the duty cycle constant.

11. Television range-finding apparatus comprising a first television camera for transforming one view of a target into a first television signal, said signal being divided into field periods recurring at field frequency, said field periods being divided into line periods recurring at line frequency; a second television camera for transforming a second view of said target into a second television signal divided into field periods and line periods; a synchronizing signal generator connected to said cameras to control the operation thereof, said generator comprising a first source of line frequency synchronizing signals and a second source of field frequency synchronizing signals; a viewing monitor comprising a cathode ray tube and scanning circuits therefor, said scanning circuits being connected to said synchronizing generator to be controlled by said synchronizing signals; first and second gated circuits having signal input terminals thereof connected to said first and second cameras respectively and having output terminals thereof connected to signal input terminals of said viewing monitor to transmit said television signal voltages from said cameras to said monitor; a gating signal generator connected to gating signal input terminals of said gated circuits to supply thereto a rectangular shaped gating signal voltage recurring at said field frequency, causing said gated circuits to supply said television signals to said monitor alternately thereby forming a single composite television picture of the target and surrounding area on said cathode ray tube, said composite picture being separated by an adjustably positioned dividing line into a first portion consisting of a first part of the image from said first camera and a second portion consisting of the complementary or second part of the image from said second camera; and electronic means adjustable to shift one of said portions laterally on the screen of said cathode ray tube to align selected portions of said target adjacent said dividing line on both sides thereof, said electronic means directly indicating the range.

12. Television range-finding apparatus comprising a first television camera for transforming one view of a target into a first television signal, said signal being divided into field periods recurring at field frequency, said field periods being divided into line periods recurring at line frequency; a second television camera for transforming a second view on said target into a second television signal divided into field periods and line periods; a synchronizing signal generator connected to said camera to control the operation thereof, said generator comprising a first source of synchronizing signals recurring at said field frequency and a second source of synchronizing signals recurring at said line frequency; a viewing monitor comprising a cathode ray tube and scanning circuits thereor, said scanning circuits being connected to said synchronizing generator to be controlled by said synchronizing signals; first and second gated circuits having signal input terminals thereof connected to said first and second cameras respectively and having output terminals thereof connected to signal input terminals of said viewing monitor to transmit said television signal voltages from said cameras to said monitor; a gating signal generator connected to gating signal input terminals of said gated circuits to supply thereto a rectangular shaped gating signal voltage recurring at said field frequency, causing said gated circuits to supply said television signals to said monitor alternately thereby forming a single composite television picture of the target and surrounding area on said cathode ray tube, said composite picture being separated by an adjustably positioned dividing line into a first portion consisting of a first part of the image from said first camera and a second portion consisting of the complementary or second part of the image from said second camera; adjustable means in said gate signal generator to vary the duty cycle of said rectangular gating signal to vary the position of said dividing line; and electronic means to shift one of said images laterally on the screen of said cathode ray tube to align selected portions of said target adjacent said dividing line on both sides thereof, said electronic means directly indicating the range.

13. Television range-finding apparatus comprising a first television camera for transforming one view of a target into a first television signal, said signal being divided into field periods recurring at field frequency, said field periods being divided into line periods recurring at line frequency; a second television camera for transforming a second view of said target into a second television signal divided into field periods and line periods; a synchronizing signal generator connected to said cameras to control the operation thereof, said generator comprising a first source of line frequency synchronizing signals and a second source of field frequency synchronizing signals; a viewing monitor comprising a cathode ray tube and scanning circuits therefor, said scanning circuits being connected to said synchronizing generator to be controlled by said synchronizing signals; first and second gated circuits having signal input terminals thereof connected to said first and second cameras respectively and having output terminals thereof connected to said viewing monitor to transmit said television signal voltages from said cameras to said monitor; a gate signal generator connected to said gated circuits to supply a rectangular shaped gating signal voltage recurring at said field frequency thereto, causing said circuits to supply said television signals to said monitor alternately thereby forming a single composite television picture of the target and surrounding area on said cathode ray tube, said composite picture being separated by an adjustably positioned dividing line into a first portion consisting of a first part of the image from said first camera and a second portion consisting of the complementary or second part of the image from said second camera; a connection between said gate generator and said first source of synchronizing pulses to control the repetition rate of said rectangular shaped gating signal voltage, a connection between said gate generator and said second source of synchronizing pulses to control the duty cycle of said gating signal; electronic means to shift one of said images laterally on the screen of said cathode ray tube to align selected portions of said target adjacent said dividing line on both sides thereof, said electronic means directly indicating the range; and a blanking generator connected to blank said monitor in accordance with said television signals from said gated circuits.

14. In a television range-finding system employing a single television camera pick-up means in combination, a pair of lenses each focussed on a photoelectric surface of said pick-up means, an optical shutter, means to operate said shutter to focus a pair of images one generated by each of said pair of lenses alternately on said pick-up means, a gated circuit having information input terminals thereof connected to said camera to receive sequential electrical signals representing said alternately impressed optical images; a gating signal generator connected to gating signal input terminals of said gated circuit to render said circuit conductive at selected intervals of time by means of a square wave gating signal; a timing generator providing at the output terminals thereof line frequency synchronizing signals and field frequency synchronizing signals, said shutter operating means being synchronized to the field frequency signals, said field frequency signals being utilized to determine the repetition rate of said gating signal and said line frequency synchronizing signals being utilized to determine the timing of said gating signal; a second and a third gated circuit; a variable delay circuit having input terminals connected to line frequency signal output terminals of said timing generator and having output terminals connected to said second gated circuit, said third gated circuit having information input terminals connected to said line frequency synchronizing signal terminals of said timing generator, the output terminals of said second and said third gated circuits being connected together; connections between said gating signal generator and gating signal input terminals of said second and third gated circuits to supply to said last-named gated circuits square wave gating signals timed to occur with and have the same repetition rate as said field frequency signals; a blanking signal generator having information input terminals connected to an output terminal of said first-named gated circuit and having other input terminals connected to said common output terminals of said second and third gated circuits; and a viewing monitor comprising a viewing screen and horizontal line and vertical field deflection circuits, output terminals of said blanking signal generator being connected to information signal input terminals of said monitor, the common output terminals of said second and third gating circuits being connected to said line frequency deflecting circuits, and a connection between said field frequency signal terminals of said timing generator and said field frequency deflection circuits in said monitor.

References Cited in the file of this patent

UNITED STATES PATENTS 2,417,446 Reynolds ---------------- Mar. 18, 1947